United States Patent
Berkley et al.

(10) Patent No.: US 10,497,011 B2
(45) Date of Patent: Dec. 3, 2019

(54) SYSTEM AND METHOD FOR DELIVERING ONLINE ADVERTISEMENTS

(75) Inventors: John Daniel Berkley, Oakland, CA (US); Scott Evan Jones, Kentfield, CA (US); Deepali Tamhane, Sunnyvale, CA (US); Mikael Rudolfson, Oakland, CA (US)

(73) Assignee: RESPONSYS, INC., Redwood Shores, CA (US)

( * ) Notice: Subject to any disclaimer, the term of this patent is extended or adjusted under 35 U.S.C. 154(b) by 0 days.

(21) Appl. No.: 13/421,364

(22) Filed: Mar. 15, 2012

(65) Prior Publication Data
US 2013/0246173 A1 Sep. 19, 2013

(51) Int. Cl.
*G06Q 30/02* (2012.01)

(52) U.S. Cl.
CPC ......... *G06Q 30/02* (2013.01); *G06Q 30/0242* (2013.01)

(58) Field of Classification Search
CPC . G06Q 30/02; G06Q 30/0242; G06Q 30/0244
USPC .............................................. 705/14.53, 7.29
See application file for complete search history.

(56) References Cited

U.S. PATENT DOCUMENTS

| | | | |
|---|---|---|---|
| 5,948,061 A | 9/1999 | Merriman et al. | |
| 6,735,572 B2 * | 5/2004 | Landesmann | G06Q 20/20 705/14.39 |
| 7,783,719 B2 | 8/2010 | Miller | |
| 7,904,520 B2 | 3/2011 | Neal et al. | |
| 8,239,267 B2 * | 8/2012 | Steelberg | G06Q 30/0264 705/14.64 |
| 8,311,890 B2 * | 11/2012 | Donovan | G06Q 30/02 705/14.73 |
| 8,327,403 B1 * | 12/2012 | Chilvers | H04N 21/4334 725/104 |
| 8,566,154 B2 | 10/2013 | Merriman et al. | |
| 8,583,749 B2 | 11/2013 | Neal et al. | |
| 9,361,631 B2 * | 6/2016 | Meyer | G06Q 30/02 |
| 2002/0111863 A1 * | 8/2002 | Landesmann | G06Q 20/20 705/14.13 |
| 2002/0116258 A1 * | 8/2002 | Stamatelatos | G06Q 30/02 705/14.53 |
| 2004/0030597 A1 * | 2/2004 | Bibas | G06Q 30/02 705/14.43 |
| 2004/0127284 A1 * | 7/2004 | Walker | G07F 17/32 463/30 |
| 2004/0158858 A1 * | 8/2004 | Paxton et al. | 725/42 |

(Continued)

OTHER PUBLICATIONS

Measuring Effectiveness and Value of Email Advertisements in Relationship-Oriented Email Messages by Dinesh Shenoy, pp. 1-70, Submitted at the Massachusetts Institute of Technology, Feb. 2008 (Year: 2008).*

*Primary Examiner* — Timothy Padot
*Assistant Examiner* — Darlene Garcia-Guerra
(74) *Attorney, Agent, or Firm* — Potomac Law Group, PLLC

(57) ABSTRACT

An ad orchestration server selects and sequences the delivery of ads based on multiple offline and online conditions. The ad orchestration server takes into account messages a user might have seen from the advertiser online which the ad server knows about through its tracking cookie, as well as other data about the user that is obtained using offline and other online methods.

20 Claims, 6 Drawing Sheets

(56) References Cited

U.S. PATENT DOCUMENTS

| | | | |
|---|---|---|---|
| 2004/0249709 A1* | 12/2004 | Donovan | G06Q 30/02 705/14.46 |
| 2005/0076051 A1* | 4/2005 | Carobus | G06Q 30/02 |
| 2005/0222903 A1* | 10/2005 | Buchheit | G06Q 10/107 705/14.54 |
| 2006/0287915 A1* | 12/2006 | Boulet | G06Q 30/02 705/14.61 |
| 2007/0005762 A1* | 1/2007 | Knox | G06Q 10/107 709/224 |
| 2007/0027765 A1* | 2/2007 | Collins | G06Q 10/0631 705/14.53 |
| 2007/0061204 A1* | 3/2007 | Ellis et al. | 705/14 |
| 2008/0102947 A1* | 5/2008 | Hays et al. | 463/31 |
| 2008/0244654 A1* | 10/2008 | Angiolillo | 725/42 |
| 2008/0275785 A1* | 11/2008 | Altberg | G06Q 30/02 705/14.54 |
| 2008/0276271 A1* | 11/2008 | Anderson et al. | 725/34 |
| 2009/0106792 A1* | 4/2009 | Kan | H04N 7/17318 725/34 |
| 2009/0172551 A1* | 7/2009 | Kane et al. | 715/733 |
| 2009/0222343 A1* | 9/2009 | Greene et al. | 705/14 |
| 2009/0228327 A1* | 9/2009 | Roy | G06Q 30/02 705/14.66 |
| 2009/0228360 A1* | 9/2009 | Mancarella | G06Q 30/02 705/14.53 |
| 2009/0265220 A1* | 10/2009 | Bayraktar | G06Q 30/02 705/14.53 |
| 2009/0298480 A1* | 12/2009 | Khambete | G06F 17/30699 455/414.1 |
| 2010/0010887 A1* | 1/2010 | Karlin | G06O 30/02 705/14.15 |
| 2010/0063877 A1* | 3/2010 | Soroca et al. | 705/14.45 |
| 2010/0324992 A1* | 12/2010 | Birch | G06Q 30/02 705/14.49 |
| 2011/0087694 A1* | 4/2011 | Haugen et al. | 707/769 |
| 2011/0208578 A1* | 8/2011 | Bergh | G06Q 30/0242 705/14.41 |
| 2011/0208592 A1* | 8/2011 | Golder | G06Q 10/107 705/14.66 |
| 2011/0212711 A1* | 9/2011 | Scott | G06Q 10/109 455/414.2 |
| 2011/0231240 A1* | 9/2011 | Schoen | G06Q 30/0242 705/14.41 |
| 2011/0258049 A1* | 10/2011 | Ramer et al. | 705/14.66 |
| 2011/0270685 A1* | 11/2011 | Marks | G06Q 30/02 705/14.66 |
| 2011/0302025 A1* | 12/2011 | Hsiao | G06Q 30/02 705/14.42 |
| 2011/0314114 A1* | 12/2011 | Young, III | G06Q 30/02 709/206 |
| 2012/0016729 A1* | 1/2012 | Higgins et al. | 705/14.25 |
| 2012/0060184 A1* | 3/2012 | Nguyen et al. | 725/36 |
| 2012/0066064 A1* | 3/2012 | Yoder et al. | 705/14.53 |
| 2012/0110615 A1* | 5/2012 | Kilar et al. | 725/32 |
| 2012/0143692 A1* | 6/2012 | Packer | 705/14.64 |
| 2012/0191546 A1* | 7/2012 | Phelan | G06Q 30/0269 705/14.67 |
| 2012/0303447 A1* | 11/2012 | Hughes | G06Q 30/0255 705/14.46 |
| 2012/0323674 A1* | 12/2012 | Simmons | G06Q 30/02 705/14.41 |
| 2013/0019262 A1* | 1/2013 | Bhatia et al. | 725/34 |
| 2013/0191209 A1* | 7/2013 | Sanghavi | G06Q 30/0241 705/14.48 |

* cited by examiner

SYSTEM AND METHOD FOR DELIVERING ONLINE ADVERTISEMENTS

BACKGROUND

Field of the Invention

Embodiments of the present invention relate to the field of online advertising and, in particular, to a system and method for delivering online advertisements.

Description of the Related Art

Today, there are several ways advertisers can specify how and when their advertisements (ads) should be served on web pages. Most of these involve scheduling an ad or series of ads to be delivered by an ad server over a defined period of time to an anonymous set of Internet users with a set of known characteristics. The known characteristics are typically user-declared information, such as gender, age, profession, etc, that the user has submitted to an advertiser or publisher, or inferred behavioral information based on specific sites visited or series of sites visited that indicate the user's interest in certain areas (sports, finance, entertainment, etc.). Users with the desired characteristics are identified using tracking cookies that have previously been placed on their computers by an ad server. When the ad server receives a request for an ad from a publisher (e.g., a web site), the ad server will return an ad to the publisher if the request is for a user with a tracking cookie with characteristics defined in the scheduled advertising campaign.

Through the ad server, the advertiser can specify ranges of time during which ads are to be served, but the advertiser has no ability to define when the ad should be served outside of a specified window of time. For example, the advertiser can schedule an ad to be served to tracking cookies with certain characteristics for the next 24 hours or the next week, etc. Ads can also be day-parted and/or time-parted, meaning ads are to be served only on certain days of the week or certain times of the day. Once an advertiser has defined the type of users the advertiser wants to target, time is the only determining factor for when the ad will be served.

However, there are several constraints to this approach. If an advertiser has defined a set of user characteristics to target before launching the campaign, but subsequently does not want to serve an ad to one of those users, or wants to serve a different type of an ad to a user who might have otherwise fit the characteristics when the campaign was first defined and set up in the ad server, because the user took an action that has since made the ad irrelevant to the user, such a change is not possible. For example, users may have already bought the product being advertised, rendering the ad less relevant and a waste of the advertiser's money, or the user may have received other communication from the company via other means such as e-mail, regular postal mail, or on social networks that is somehow inconsistent with the communication in the ad. Consequently, the ad should not be served to avoid confusion, or it should contain a different message that is more consistent with the messages from the other channels.

In an attempt to increase ad relevancy, advertisers sometimes use the concept of "storyboarding" with their ads. This involves serving a user multiple ads in a specific sequence that collectively tell a consistent story. For example, an ad with a specific message is first served to the user, and if the ad server records that the ad was served successfully, it will attempt to serve a second (and possibly third and fourth) ad with a different message that builds on the first message. Storyboarding techniques employ factors other than time for serving an ad to a user with specific cookie characteristics, but it is still very limited in its ability to orchestrate delivery of ads to specific users, and because it takes into account only what other messages have been served to that user by that specific ad server, not other ad servers or marketing systems such as e-mail servers or mobile SMS servers.

SUMMARY

One or more embodiments of the present invention enable advertisers to select and sequence the delivery of display ads taking into account specific user information and the flow of marketing messages from different systems that have already been delivered, or is scheduled to be delivered, to a specific user. In one embodiment, an ad server takes into account various messages from different kinds of marketing systems a user might have seen from the advertiser online, which the ad server knows about through integration with other marketing systems, and in addition other data about the user that is obtained from other sources with information about a company's customers and prospective customers, such as, but not limited to, CRM data bases, sales force automation systems, ERP systems, analytics systems, and purchase and reservation systems, among others. A "display ad" or "display advertisement" as used herein may be a banner ad, a video ad, flash animation, a JPEG image, or the like that is served on a web page.

A method of coordinating delivery of a display advertisement to a user computer in which a tracking token is stored, according to an embodiment of the invention, includes the steps of receiving the tracking token and mapping the tracking token to a unique user identifier, wherein the unique user ID is associated with a specific user record, retrieving data associated with the specific user record that relate to past behavior of the user, and marketing messages previously communicated, or scheduled to be communicated, to the user, checking the data to determine whether conditions, such as marketing messages received, scheduled to be received, and specific user behavior, have been met for the user to receive a display advertisement; and if the conditions are met, selecting the display advertisement for the user and causing the display advertisement to be delivered to the user. The specific user behavior may include clicking on marketing messages, buying a product (online or offline), abandoning shopping carts, browsing certain pages, calling a company's call center, etc.

Embodiments of the present invention further include a non-transitory computer-readable storage medium storing instructions that when executed by a computer system cause the computer system to perform one of the methods set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
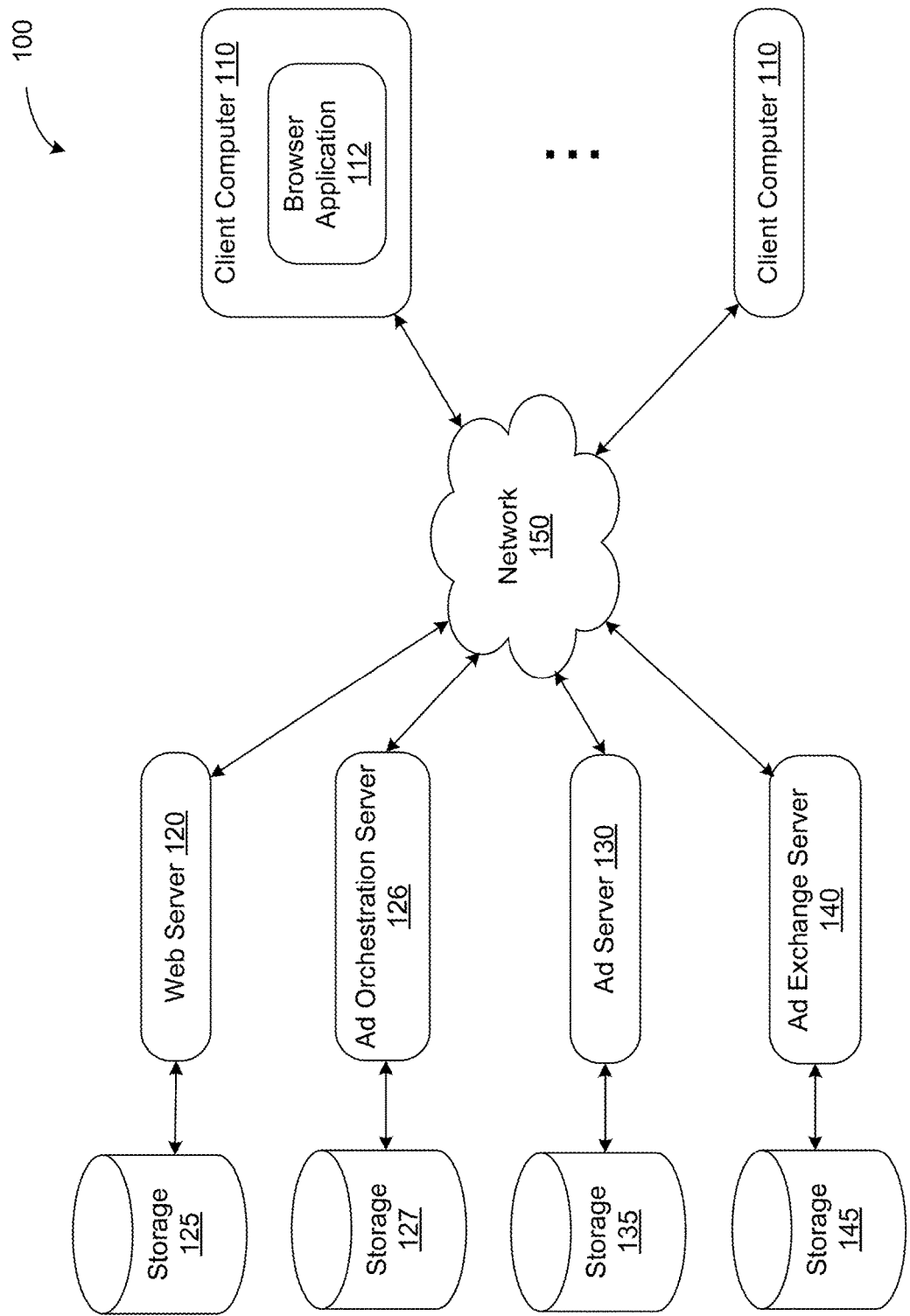
FIG. 1 illustrates a networked computing system 100 configured for delivering online advertising, according to an embodiment of the invention.

FIG. 1 illustrates a networked computing system 100 configured for delivering online advertisements (ads), according to an embodiment of the invention. As shown, networked computing system 100 includes a web server 120, an orchestration server 126, an ad server 130, an ad exchange server 140, and a plurality of client computers 110 (only two of which are shown for clarity), each connected to a communications network 150 (e.g., the Internet). In one example, web server 120 is programmed to communicate with the client computers 110, ad orchestration server 126, ad server 130, and ad exchange server 140 using TCP/IP protocol.

Each client computer 110 includes conventional components of a computing device, e.g., a processor, system memory, a hard disk drive, input devices such as a mouse and a keyboard, and/or output devices, such as a monitor. Web server 120 includes a processor and system memory, and is configured to manage web pages and other media content stored in its respective content storage unit 125 using a file system and/or a relational database. Ad orchestration server 126 is a specialized web server configured to select a display ad for users in the context of other messages that the users may have received through other marketing channels and various online and offline actions, as well as characteristics of the users, such as age, gender, demographics, location, etc. Content storage unit 127 includes a database that is configured to maintain user profiles and to receive feeds from the other marketing channels and sources to record what other messages the users may have received through the other marketing channels and the online and offline actions of the users, including, but not limited to, (1) purchase of a product being advertised (online or offline); (2) online shopping cart abandonment; (3) subscription to a service or other communication from marketer; (4) communication with marketer (call, e-mail, letter); (5) cancellation of services; and (6) change of address. Ad server 130 is a web server configured to deliver advertising content selected by and as directed by ad orchestration server 126. Ad server 130 may be managed by an advertiser or by a third party for an advertiser or a group of advertisers, and also includes a content storage unit 135 for storing advertising content. Only one ad server 130 is illustrated in FIG. 1 for simplicity. However, it should be recognized that a multitude of ad servers exist on the Internet today. Ad exchange server 140 represents a server for an ad exchange, which is a technology platform that facilitates the buying and selling of online advertising space. Only one ad exchange server 140 and its corresponding content storage unit 145 is illustrated in FIG. 1 for simplicity. However, it should be recognized that a number of different ad exchanges and ad exchange servers exist on the Internet today. Some examples are AppNexus, Right Media, and DoubleClick.

In the embodiments of the present invention described below, users are respectively operating client computers 110 to request web pages and other media content data from web server 120. Each client computer 110 is configured to execute a software application, such as a web browser application 112, and access web pages and/or media content data managed by web server 120 by specifying a uniform resource locator (URL) for web server 120 into web browser application 112. The web pages that are displayed to a user are transmitted from web server 120 to the user's client computer 110 and processed by web browser application 112 for display through a monitor of the user's client computer 110.

Often, the web pages that are displayed to the user contain advertising content. In one embodiment, the HTML (Hypertext Markup Language) code that web browser application 112 processes to generate the web pages includes an "ad tag." When the ad tag is processed by web browser application 112, an HTTP (Hypertext Transfer Protocol) request is transmitted to ad server 130 or ad exchange server 140. In most cases, publisher web sites (in one example, the one managing web server 120) make their advertising inventory available to ad exchanges so the HTTP request is typically transmitted to ad exchange server 140. In other cases, publisher web sites interact directly with ad server 130, and transmit HTTP requests directly to ad server 130. If this is a very first HTTP request made by web browser application 112 to ad exchange server 140, a tracking cookie is generated by ad exchange server 140 and transmitted to web browser application 112 for storage by web browser application 112 in client computer 110. Subsequent HTTP requests made by web browser application 112 to ad exchange server 140 include this tracking cookie. In response to the HTTP request, ad exchange server 140 places the advertising space up for bid, processes the different bids from different ad servers, and permits the advertising content of the winning bidder to be transmitted to web browser application 112 for display at client computer 110.

Figure 2:
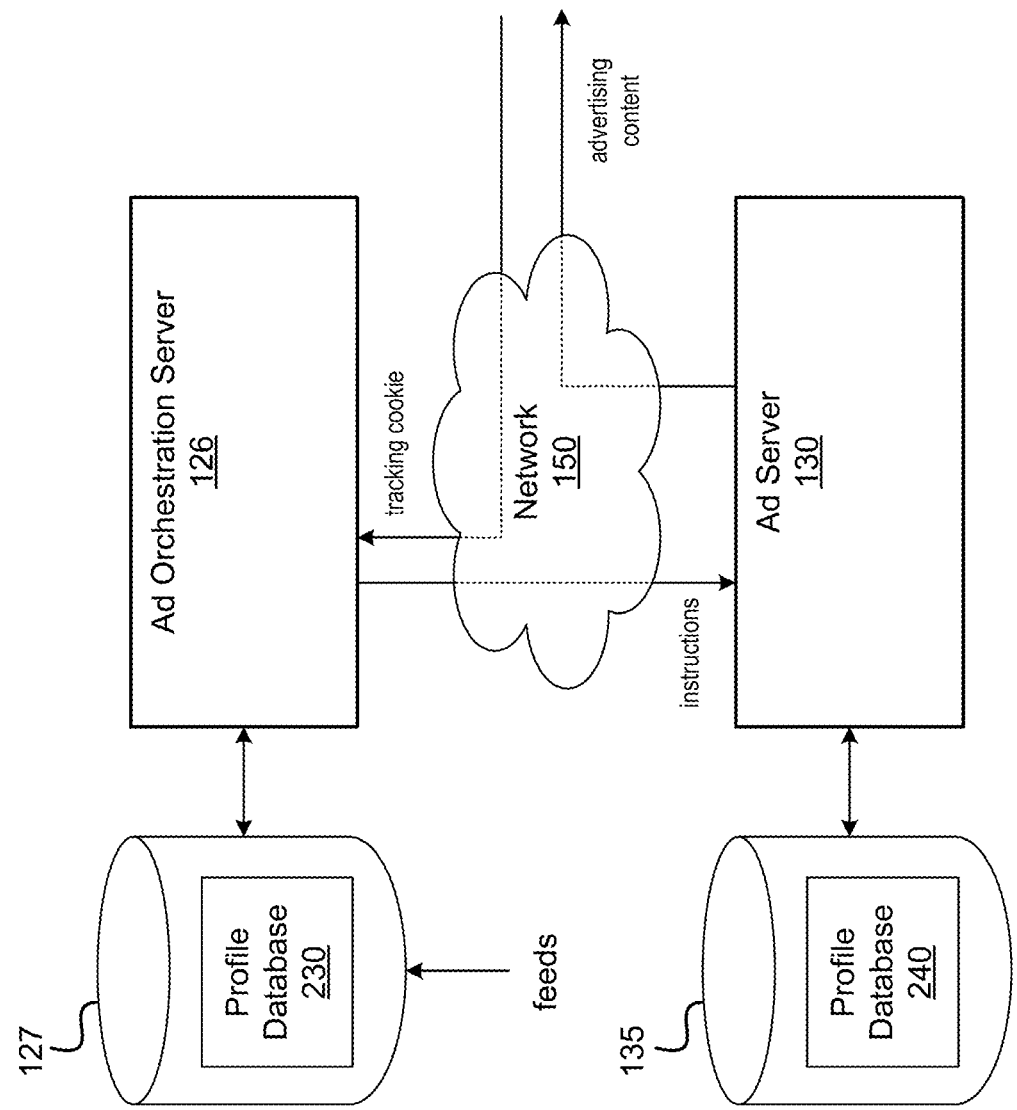
FIG. 2 schematically illustrates a process of orchestrating the delivery of display advertisements according to an embodiment of the invention.

FIG. 2 schematically illustrates a process of orchestrating the delivery of display advertisements according to an embodiment of the invention. As illustrated in FIG. 2, ad server 130 receives tracking cookies (from web server 120 or ad exchange server 140). When ad server 130 originally generated the tracking cookie on a user's computer, it associated the tracking cookie with a unique user ID (UUID) that orchestration server 126 uses to identify that specific individual. Ad server 130 is either told in advance to target certain UUIDs, or will check with ad orchestration server 126 in real-time whether a certain UUID should be targeted as the corresponding tracking cookie for that UUID is passed from web server 120 or ad exchange server 140. In the former case, ad orchestration server 126 processes all users it wants to target from storage 127, and passes the corresponding UUIDs along with a message (e.g., different types of ad creative that have been uploaded in advance into ad server 130, or are assembled in real-time depending on who the user is) to include in the display ad and how much to bid for the inventory to ad server 130, which in turn will map the UUIDs to tracking cookies and target them when it receives requests from a client computer 110 with tracking cookies that match the UUIDs. In the latter case, ad server 130 receives a tracking cookie from web server 120 or ad exchange server 140. Ad server 130 maps the tracking cookie to a UUID that it sends to ad orchestration server 126, which in turn processes the request and tells ad server 130 whether to target that UUID or not, and if so, what message to include in the display ad and how much to bid or pay for the ad inventory. The determination of whether or not a display ad should be delivered is made based on certain timing criteria and certain actions of the specific individual, as will be described in further detail in conjunction with FIG. 3. The profile data of specific individuals tracked by ad orchestration server 126 is stored as a profile database 230 in content storage unit 127. Content storage unit 127 also receives feeds from the other marketing channels and sources to record what other messages the users may be have received through the other marketing channels and the online and offline actions of the users. Examples of other marketing channels include e-mail communications, SMS message communications, and communications through a social networking web site (e.g., Facebook) or a microblogging service (e.g., Twitter). The profile data of specific individuals tracked by ad server 130 is stored as a profile database 240 in content storage unit 135.

Figure 3:
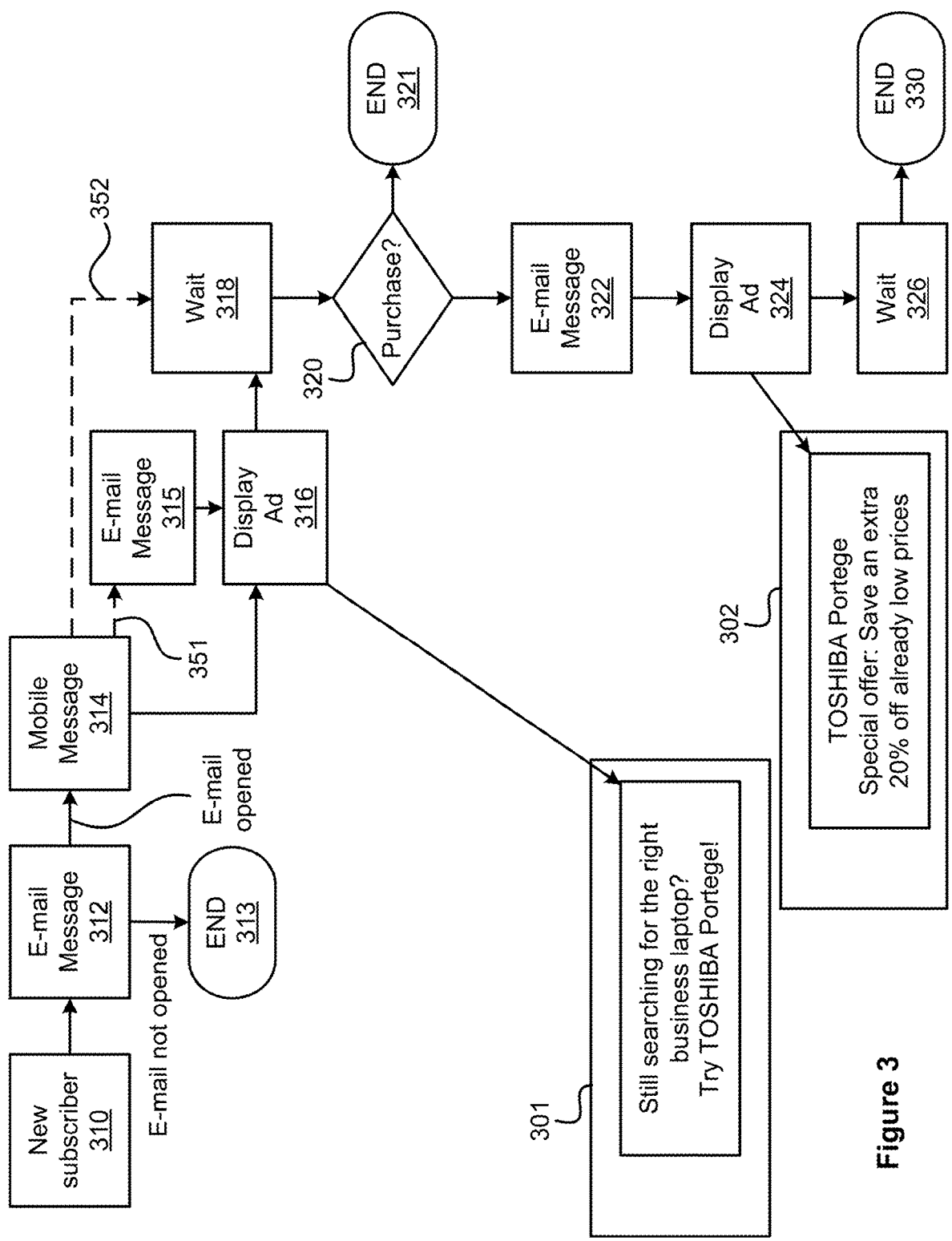
FIG. 3 illustrates one example of display advertisements that can be sequenced and selected within a marketing program that includes e-mail and SMS message communications.

FIG. 3 illustrates one example of how advertisements can be sequenced and selected within a marketing program that includes e-mail and SMS message communications. Delivery of each advertisement may be dependent on subsequent messages from other channels having been delivered, or is scheduled to be delivered, to an individual, and the individual having certain characteristics and have taken specifically defined actions within a certain time period. It should be noted that FIG. 3 is an example only, and the rules and criteria for which users see what ads at what time transcend this example, and can include any possible configuration of advertising messages delivered, or scheduled to be delivered, and/or any type of user action or characteristics of the user to which ad orchestration server 126 and its storage 127 have access.

The sequence of communications according to the marketing program shown in FIG. 3 is directed to a new subscriber 310 and begins with an e-mail message 312. E-mail message 312 is followed by a mobile message 314, e.g., SMS message. The communication that is third in sequence is a display ad 316. When ad orchestration server 126 determines that e-mail message 312 has been opened by new subscriber 310 and mobile message 314 has been successfully transmitted to new subscriber 310, ad orchestration server 126 instructs ad server 130 to deliver display ad 316 to new subscriber 310 upon determining that new subscriber 310 is viewing a web page 301 that has an advertising space controlled or purchased by ad orchestration server 126. If ad orchestration server 126 determines that e-mail message 312 has not been opened, this marketing program for new subscriber 310 terminates at 313.

When new subscriber 310 opens e-mail message 312, a tracking cookie that includes a unique user ID (UUID) of new subscriber 310 is generated by ad orchestration server 126 and stored in the computer of new subscriber 310. As a result, any subsequent requests by new subscriber 310 for a web page that has an advertising space controlled or purchased by ad orchestration server 126, result in an HTTP request for a display ad being issued to ad orchestration server 126, where such HTTP request includes the tracking cookie with the UUID of new subscriber 310 so that ad orchestration server 126 is able to specifically identify the user associated with the tracking cookie and determine whether a display ad should or should not be delivered to new subscriber 310. It should be recognized that tracking cookies can be generated in other ways and from other e-mails not related to this specific marketing program. For example, new subscriber 310 may have received a cookie a month earlier from a new product promotion, and that cookie remained on the computer of new subscriber 310 when this marketing program began. In such cases, the old tracking cookie would be used and no new tracking cookie would be set.

As part of this marketing program, a predetermined amount of time is allowed to pass at wait block 318 before sending new subscriber 310 another e-mail message, e.g., e-mail message 322. After sending e-mail message 322, ad orchestration server 126 instructs ad server 130 to deliver display ad 324 to new subscriber 310 upon determining that new subscriber 310 is viewing another web page 302 that has an advertising space controlled or purchased by ad orchestration server 126. It should be noted that display ad 324 is different from display ad 316 and intended to complement or supplement the advertising message contained in display ad 316. In the example given in FIG. 3, display ad 316 merely introduces new subscriber 310 to a certain product and display ad 324 informs new subscriber of a special promotion for the same product.

During the waiting period, if it is determined that the user made a relevant purchase (decision block 320), e.g., user purchased a laptop in the case where the display ads are advertisements for a laptop, the marketing program terminates for new subscriber 310 at 321. On the other hand, if no such purchase is made, e-mail message 322 is sent and display ad 324 is delivered to new subscriber 310 for display the next time new subscriber 310 visits a web page that has advertising space controlled or purchased by ad orchestration server 126 A predetermined amount of time is allowed to pass at wait block 326, and the marketing program terminates thereafter at 330 for new subscriber 310.

To some subscribers, e.g., those who are less engaged in mobile, another e-mail message 315 may be delivered prior to delivery of display ad 316. This first alternative path is shown in FIG. 3 with arrow 351. In addition, delivery of display ad 316 to some subscribers may be skipped altogether by ad orchestration server 126 as ad orchestration server 126 may be selective about which subscribers should receive display ads. This second alternative path is shown in FIG. 3 with arrow 352.

The additional control introduced by ad orchestration server 126 as to which users actually see a display ad, when they see that display ad relative to other external events and what exactly the message in the display ad is, provides advertisers the ability to be more relevant and timely in the display ads delivered to the users, and be far more effective with their marketing budget by getting the most out of their display ads and not wasting display ads on users that may no longer be interested based on events not natively captured in the conventional ad server using tracking cookies. For example, a conventional ad server may serve ads for a rental car company to users of a specific age group in a specific region of the country during certain times or days of the month. According to embodiments of the present invention, that same rental car company, via ad orchestration server 126, would instruct ad server 130 to serve display ads with a promotional offer to rent a car to a targeted segment of users only after it determines that the users have received a similar offer via e-mail. In addition, the message in the display ad may be tailored depending on whether or not the user had opened the e-mail or performed some sort of action, or it may be tailored to take into account the weather in the local region where the user is, if such information is available to ad orchestration server 126. For example, on sunny days, users might see offers for convertible rental cars, and during rainy or snowy days, they might see offers for 4×4 SUVs. Additionally, if a user has already made a reservation for a car, ad orchestration server 126 may serve a display ad that aligns with the reservation made, such as an offer to upgrade, or serve no display ad at all, depending on the marketer's defined preference.

Accordingly, one or more embodiments of the present invention enable advertisers to sequence the delivery of advertisements to a user, or even cease the delivery of advertisements, as well as dynamically create advertisements, based on timing relative to some other defined event and the user's status. For example, advertisements may be delivered: (1) a certain time period after the user qualifies for in-segment status as defined by the advertiser; (2) a certain period of time after another advertisement is delivered from any marketing channel to the user; (3) a certain period of time after the user takes certain action, including, but not limited to, opening an e-mail, clicking on an advertisement, clicking on a specific link in an e-mail or on a web page; and (4) a certain period of time after the user visits a specific web site/URL. In addition, delivery of advertisements or ceasing delivery may be influenced by, but not limited to: (1) purchase of a product being advertised (online or offline); (2) online shopping cart abandonment; (3) subscription to a service or other communication from marketer; (4) communication with marketer (call, e-mail, letter); (5) cancellation of services; and (6) change of address.

Figure 4:
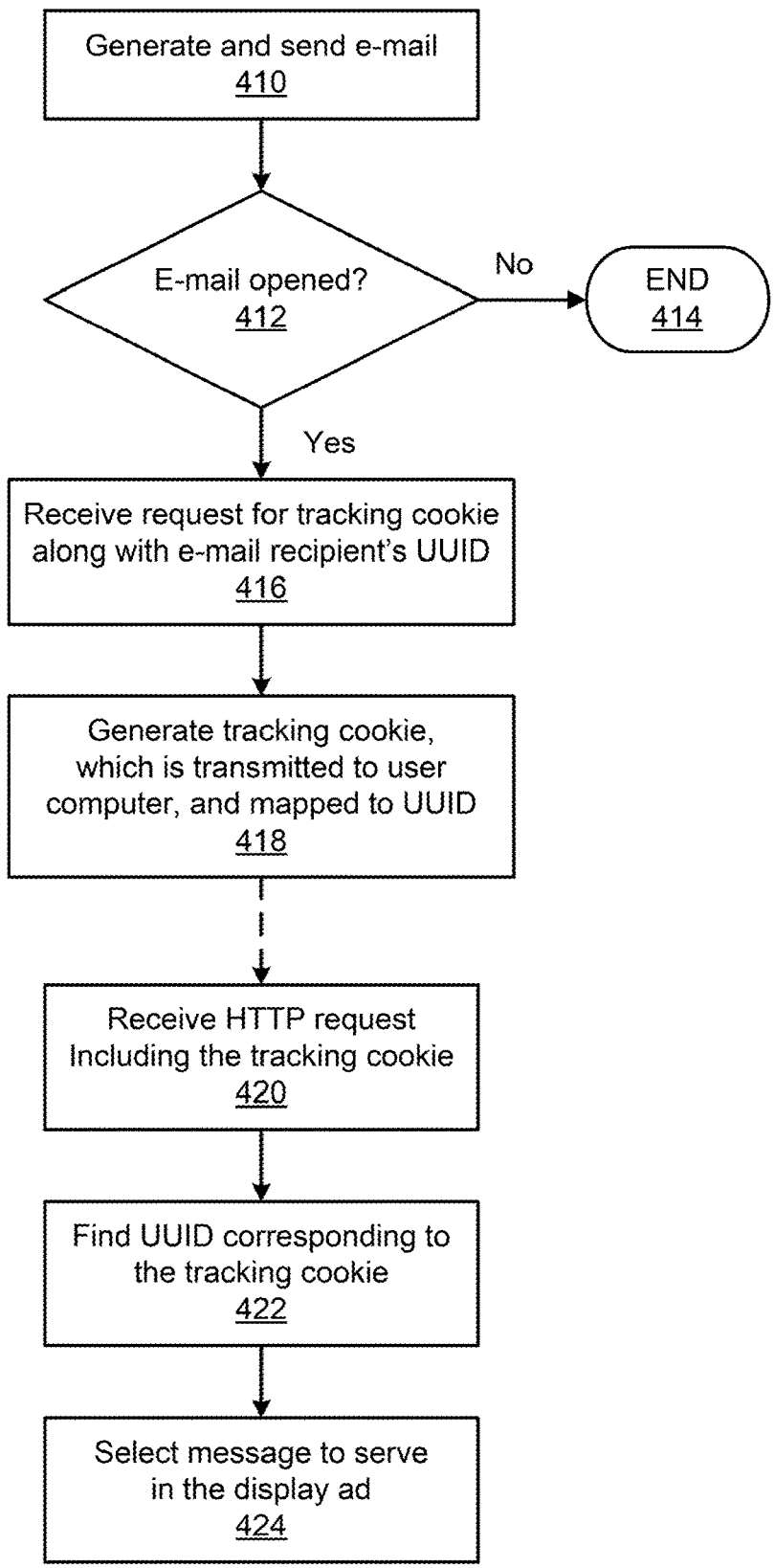
FIG. 4 is a flow diagram that illustrates the process carried out by an ad server to collect profile data of specific individuals in accordance with an embodiment of the present invention.

FIG. 4 is a flow diagram that illustrates the process carried out to set a tracking cookie on the user's computer and associate that cookie with a UUID in accordance with an embodiment of the present invention. At step 410, the e-mail server generates and sends an e-mail to a number of different individuals. Some individuals may not open their e-mail, as determined by decision block 412, in which case, the process terminates at step 414. For those individuals who do open their e-mail, the ad server (e.g., ad server 130) receives notification (e.g., via a hidden HTTP request) that the e-mail has been opened (step 416). The notification to the ad server includes a UUID. In response to such notification, the ad server at step 418 generates a tracking cookie which it maps to the UUID passed from the user's e-mail. The tracking cookie is associated with the UUID, and the ad server transmits the tracking cookie to the user's computer. Next time this individual visits a web page that includes advertising space purchased or controlled by an ad server (e.g., ad orchestration server 126), an HTTP request that includes the tracking cookie will be transmitted to the ad server and received by the ad server at step 420. The ad server will at this point look up which UUID corresponds to the tracking cookie (step 422). Once the tracking cookie has been identified as a UUID, the ad server will check whether that UUID should be targeted at this point, based on what information has been provided by the ad orchestration server in advance of the request, and if so, which message to serve in the display ad (step 424). Alternatively, the ad server may check in real-time with the ad orchestration server after it has identified the UUID for the tracking cookie whether that specific UUID should be targeted. The ad orchestration server will at the time of the request evaluate whether the UUID should be targeted, and if so which message to serve in the display ad, and pass that information back to the ad server.

Figure 5:
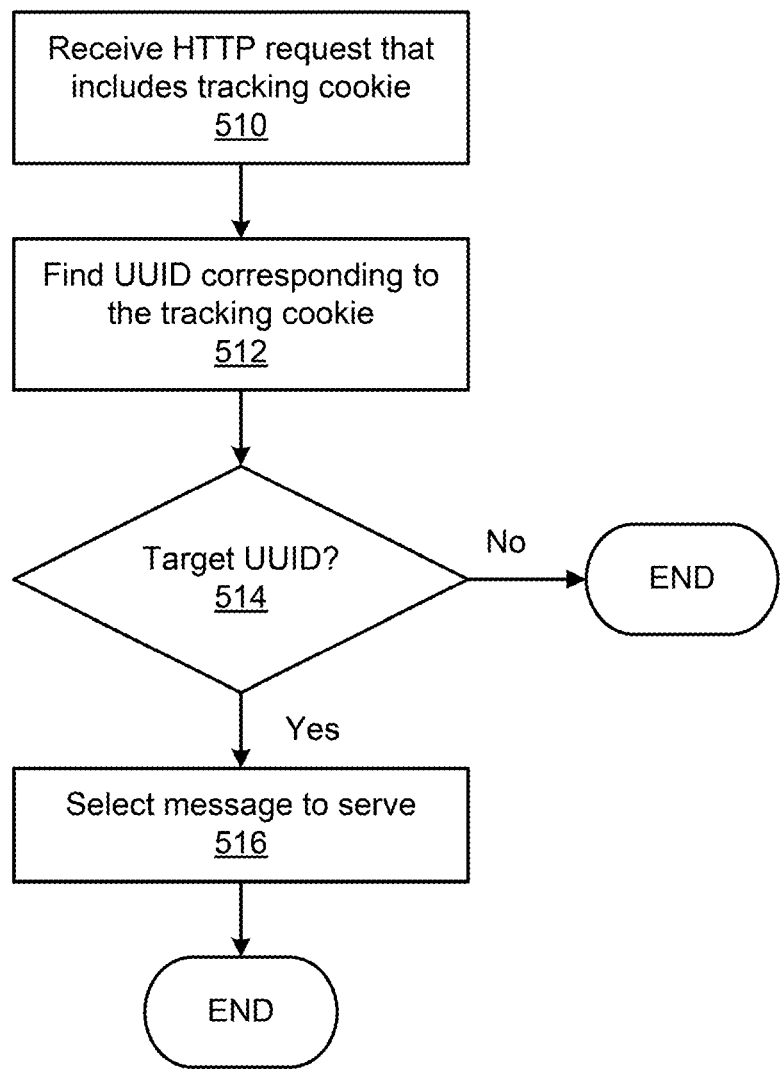
FIG. 5 is a flow diagram that illustrates the process carried out by an ad server to select an advertisement in accordance with an embodiment of the present invention.
Figure 6:
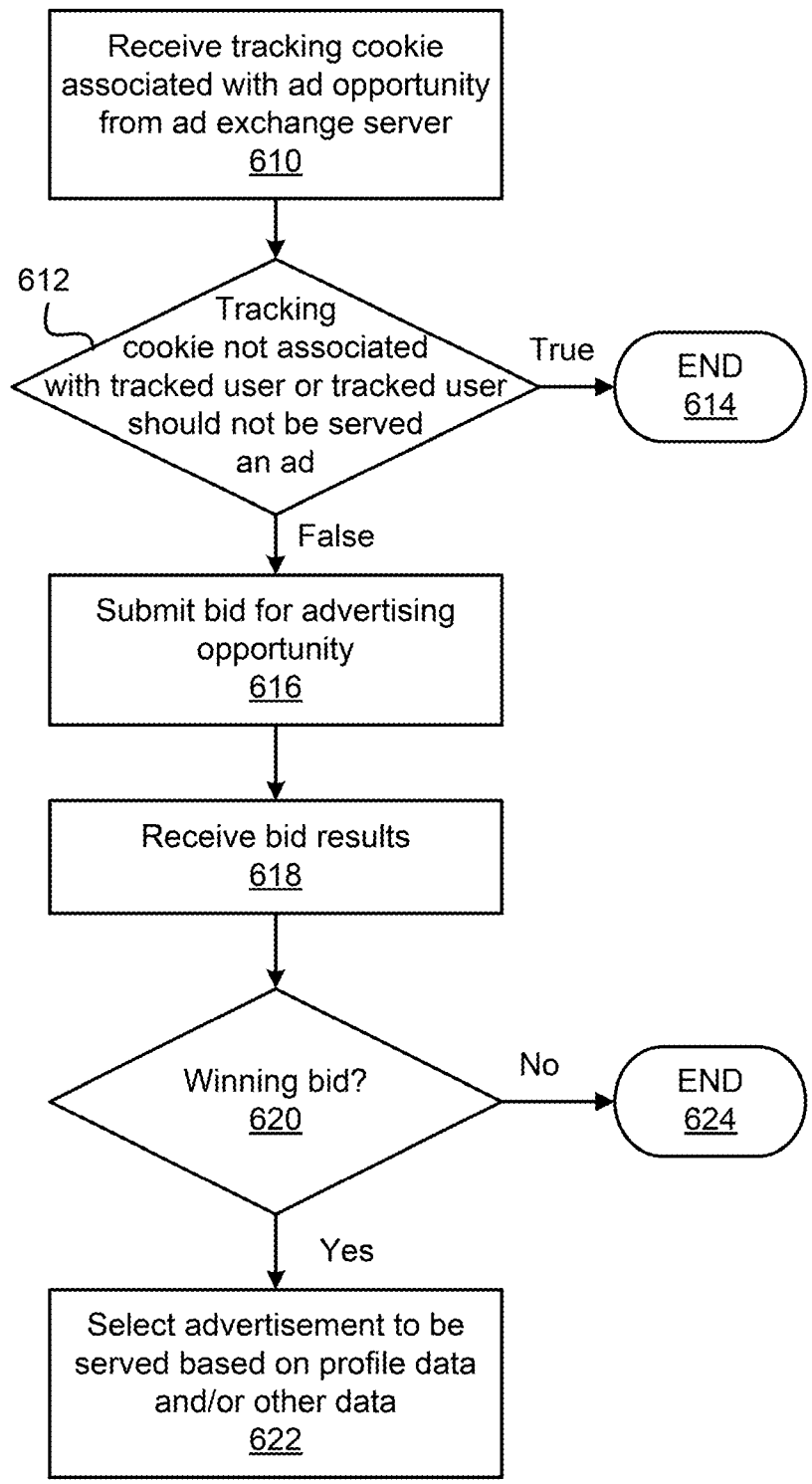
FIG. 6 is a flow diagram that illustrates the process carried out by an ad server to select an advertisement in accordance with another embodiment of the present invention.

FIG. 5 is a flow diagram that illustrates the two different processes carried out by an ad orchestration server (e.g., ad orchestration server 126) and an ad server (e.g., ad server 130) to select an advertisement in accordance with an embodiment of the present invention. In this embodiment, the HTTP request for advertising content includes a tracking cookie that the ad server generated. FIG. 6 is a flow diagram that illustrates the process carried out by an ad orchestration server (e.g., ad orchestration server 126) to select an advertisement in accordance with another embodiment of the present invention, in which the ad orchestration server is notified of an advertising opportunity by an ad exchange server (e.g., ad exchange server 140), and the tracking cookie provided by the ad exchange server contains the tracking cookie generated by the ad exchange server.

There are two ways in which the ad server will make a decision as to whom to target and what message to serve. This decision is based on various defined events and the user's status, some examples of which are set forth above.

The first way is for the ad orchestration server to pass to the ad server at a set interval all the UUIDs to be targeted, along with what message to serve in the display ad to each user. When the ad server receives the HTTP request that includes a tracking cookie that the ad server generated at step 510, the ad server maps the tracking cookie to the UUID that was passed to the ad server at the time of the tracking cookie generation (step 512). Then, at step 514, the ad server looks up whether that UUID should be targeted, and if so, selects the message to serve at step 516.

The second way is for the ad server to receive the HTTP request that includes a tracking cookie that the ad server generated. When the ad server receives the request at step 510, it maps the tracking cookie to the UUID that was passed to the ad server at the time of the tracking cookie generation (step 512). The ad server passes the request to the ad orchestration server. The orchestration server processes the request, and determines at step 514 whether the UUID should be targeted, and if so, selects the message to serve at step 516. The orchestration server passes the information back to the ad server with information of whether to target the UUID or not, and if so, what message to serve.

As discussed above, the profile data used by the orchestration server to make decisions on whether to serve a user an ad, and if so, what ad to serve, includes data about the individual collected using the tracking cookie and declared by the user directly to a company during a registration process or other interactions, and the other data include a record of what other messages the individual may be have received through other marketing channels and various online and offline actions of the individual. There is no limit to what profile data the orchestration server can collect on a user or how it uses it to make decisions on ad serving and ad selection. The ad orchestration server determines whether or not to deliver an advertisement based on what other messages the individual may have received through other marketing channels and various other criteria, and selects an advertisement from a pool of available advertisements at step 516 (and in some embodiments, tailors the advertising message) using the profile data and other data such as time/date and environmental data. For example, if the other data indicates that the individual has purchased a certain product and the individual is currently targeted in marketing campaign for that product, the ad orchestration server will tell the ad server to not serve an advertisement to the individual. As another example, if the individual recently received an advertisement for a certain product through an e-mail communication or via Facebook or Twitter, a discount coupon for the same product may be selected as the advertisement to be delivered to the individual.

The process illustrated in FIG. 6 begins at step 610 with the ad orchestration server receiving from an ad exchange server, e.g., ad exchange server 140, a tracking cookie associated with the potential advertising opportunity. Step 612 is carried out to determine whether or not the tracking cookie should be targeted. This can be done as described for FIG. 5 by the ad orchestration server having passed the ad server all eligible UUIDs to target in advance, or by having the ad server check with the ad orchestration server in real time for each http request it receives. In one embodiment, any of the various tracking cookie synchronization methods well known in the art may be employed to determine whether there is a correlation between the tracking cookie associated with the potential advertising opportunity and the tracking cookie generated by the ad orchestration server to track the specific individuals known by the ad orchestration server. If the tracking cookie is not associated with any of the specific individuals that the ad orchestration server is tracking or the ad orchestration server determines that the specific individual associated with the tracking cookie should not be served an advertisement according to its selection criteria, the process ends at step 614 with the ad server not submitting a bid for the potential advertising opportunity. On the other hand, if the tracking cookie is associated with a specific individual that the ad orchestration server is tracking and the ad orchestration server has determined that the specific individual associated with the tracking cookie should be served an advertisement according to its selection criteria, the ad orchestration server will pass this information, either in real time or in advance of any user requests, to the ad server. The ad server may have a pre-negotiated right to serve a set number of ads on a web site from which the ad request originated, in which case the ad server simply returns the appropriate ad to the web site. If there is no pre-negotiated relationship with the web site, and the ad request came through an intermediary such as an ad network or ad exchange, the ad server submits a bid for the potential advertising opportunity at step 616, and waits for the bidding results at step 618. If it is determined at step 620 that the ad server won the bid, at step 622, the ad orchestration server selects an advertisement from a pool of available advertisements (and in some embodiments, tailors the advertising message) as described in step 516 above. If it is determined at step 620 that the ad orchestration server lost the bid, the process ends at step 624.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method of coordinating delivery of an advertising message with other advertising messages and user actions to a user computer in which a tracking cookie is stored, comprising the steps of:

maintaining an orchestration server to coordinate delivery of a sequence of advertising messages from a plurality of servers to a user computer over a network, the sequence of advertising messages comprising advertising messages to be communicated over at least two communications channels corresponding to at least two different servers of the plurality of servers, a first server to deliver an earlier advertising message in the sequence of advertising messages on a first channel and a second server to deliver a next advertising message in the sequence of advertising messages on a second channel;

sending, from the first server, the earlier advertising message to the user computer over the network, the earlier advertising message being an email message and the first server is an email server, wherein the earlier advertising message comprises a first advertisement for a product when it is sent from the first server;

receiving, at the second server, a hidden Hypertext Transfer Protocol (HTTP) request from the user computer over the network, the hidden HTTP request including a unique user identifier (UUID) and indicating that the email message has been opened at the user computer, wherein the second server is a display ad server;

generating, at the second server, a tracking cookie associated with the UUID;

sending, from the second server, the tracking cookie to the user computer over the network;

receiving, at the second server, an HTTP request from the user computer over the network, the HTTP request including the tracking cookie, the HTTP request being transmitted as a result of loading a web page comprising at least a tag that, when processed by a web browser application on the user computer, causes the web browser application to transmit the HTTP request, mapping, at the second server, the tracking cookie to the associated UUID;

sending, from the second server, the HTTP request and the associated UUID to the orchestration server over the network;

in response to receiving the HTTP request and associated UUID at the orchestration server:

retrieving, from a profile database in a content storage unit associated with the orchestration server, a specific user record associated with the UUID, the specific user record including first data relating to past behavior of a user, second data associated with the earlier advertising message previously communicated to the user computer on the first channel, and third data associated with the next advertising message to be communicated to the user computer via the second channel, determining, based on the first data, the second data, and the third data retrieved from the profile database, whether one or more conditions have been met for the user to receive the next advertising message of the sequence of advertising messages, the conditions comprising online or offline actions of the user, selecting the next advertising message of the sequence of advertising messages based on said determining whether one or more conditions have been met, and sending, to the second server over the network, an instruction to deliver the next advertising message of the sequence of advertising messages to the user computer, the instruction including the associated UUID and the selected next advertising message, the next advertising message being stored in a database associated with the second server; and in response to receiving the instruction from the orchestration server at the second server, sending from the second server the next advertising message to the user computer over the network, the next advertising message comprising a display ad that comprises a second advertisement for the product, wherein at least one of the one or more conditions is met when the email message has been opened, the next advertising message only being sent after the email message has been opened and in response to the email message being opened, and wherein the display ad is selected from a plurality of display ads based in part on bids received from a plurality of ad servers.

2. The method of claim 1, wherein the one or more conditions include whether or not the user has purchased a product that was advertised in the email message sent by the email server.

3. The method of claim 1, wherein the one or more conditions comprises online or offline actions of the user include one or more of clicking on marketing messages, buying a product online or offline, abandoning shopping carts, browsing certain pages, and calling a call center.

4. The method of claim 1, wherein the sequence of advertising messages further includes a third advertising message comprising a mobile message that is sent from a third server, the third advertising message only being sent after the email message has been opened and in response to the email message being opened.

5. The method of claim 1, wherein a criterion for selecting the next advertising message includes whether or not the next advertising message has been previously delivered to the user.

6. The method of claim 5, further comprising:
customizing the next advertising message based on the earlier advertising message that has been previously delivered to the user.

7. The method of claim 5, wherein the earlier and next advertising messages delivered to the user are different but related to the same product.

8. A non-transitory computer readable storage medium comprising instructions to be executed in one or more a computer systems to cause the computer systems to carry out a method of coordinating delivery of advertising messages, the method comprising:
maintaining an orchestration server to coordinate delivery of a sequence of advertising messages from a plurality of servers to a user computer over a network, the sequence of advertising messages comprising advertising messages to be communicated over at least two communications channels corresponding to at least two different servers of the plurality of servers, a first server to deliver an earlier advertising message in the sequence of advertising messages on a first channel and a second server to deliver a next advertising message in the sequence of advertising messages on a second channel;

sending, from the first server, the earlier advertising message to the user computer over the network, the earlier advertising message being an email message and the first server is an email server, wherein the earlier advertising message comprises a first advertisement for a product when it is sent from the first server;

receiving, at the second server, a hidden Hypertext Transfer Protocol (HTTP) request from the user computer over the network, the hidden HTTP request including a unique user identifier (UUID) and indicating that the email message has been opened at the user computer, wherein the second server is a display ad server;

generating, at the second server, a tracking cookie associated with the UUID;

sending, from the second server, the tracking cookie to the user computer over the network;

receiving, at the second server, an HTTP request from the user computer over the network, the HTTP request including the tracking cookie, the HTTP request being transmitted as a result of loading a web page comprising at least a tag that, when processed by a web browser application on the user computer, causes the web browser application to transmit the HTTP request, mapping, at the second server, the tracking cookie to the associated UUID;

sending, from the second server, the HTTP request and the associated UUID to the orchestration server over the network;

in response to receiving the HTTP request and associated UUID at the orchestration server:
retrieving, from a profile database in a content storage unit associated with the orchestration server, a specific user record associated with the UUID, the specific user record including first data relating to past behavior of a user, second data associated with the earlier advertising message previously communicated to the user computer on the first channel, and third data associated with the next advertising message to be communicated to the user computer via the second channel, determining, based on the first data, the second data, and the third data retrieved from the profile database, whether one or more conditions have been met for the user to receive the next advertising message of the sequence of advertising messages, the conditions comprising online or offline actions of the user, selecting the next advertising message of the sequence of advertising messages based on said determining whether one or more conditions have been met, and sending, to the second server over the network, an instruction to deliver the next advertising message of the sequence of advertising messages to the user computer, the instruction including the associated UUID and the selected next advertising message, the next advertising message being stored in a database associated with the second server; and in response to receiving the instruction from the orchestration server at the second server, sending from the second server the next advertising message to the user computer over the network, the next message comprising a display ad that comprises a second advertisement for the product, wherein at least one of the one or more conditions is met when the email message has been opened, the next advertising message only being sent after the email message has been opened and in response to the email message being opened, and wherein the display ad is selected from a plurality of display ads based in part on bids received from a plurality of ad servers.

9. The non-transitory computer readable storage medium of claim 8, wherein the one or more conditions include whether or not the user purchased a product that was advertised in the email message sent by the email server.

10. The non-transitory computer readable storage medium of claim 8, wherein the one or more conditions comprises online or offline actions of the user include one or more of clicking on marketing messages, buying a product, online or offline, abandoning shopping carts, browsing certain pages, and calling a call center.

11. The non-transitory computer readable storage medium of claim 8, wherein the sequence of advertising messages further includes a third advertising message comprising a mobile message that is sent from a third server, the third advertising message only being sent after the email message has been opened and in response to the email message being opened.

12. The non-transitory computer readable storage medium of claim 8, wherein a criterion for selecting the next advertising message includes whether or not the next advertising message has been previously delivered to the user.

13. The non-transitory computer readable storage medium of claim 12, wherein the method further comprises the step of:
customizing the next advertising message based on the earlier advertising message that has been previously delivered to the user.

14. The non-transitory computer readable storage medium of claim 12, wherein the earlier and next advertising messages delivered to the user are different but relate to the same product.

15. A system that coordinates delivery of an advertising message with other advertising messages to a user computer in which a tracking token is stored, comprising:
a plurality of servers, coupled to a network, including a first server and a second server; and
an orchestration server, coupled to the network, to coordinate delivery of a sequence of advertising messages from the plurality of servers to a user computer over the network, the sequence of advertising messages comprising advertising messages to be communicated over at least two communications channels corresponding to at least two different servers of the plurality of servers, the first server to deliver an earlier advertising message in the sequence of advertising messages on a first channel and the second server to deliver a next advertising message in the sequence of advertising messages on a second channel;
wherein:
the first server is configured to send the earlier advertising message to the user computer over the network, the earlier advertising message being an email message and the first server is an email server, wherein the earlier advertising message comprises a first advertisement for a product when it is sent from the first server,
the second server is configured to:
receive a hidden Hypertext Transfer Protocol (HTTP) request from the user computer over the network, the hidden HTTP request including a unique user identifier (UUID) and indicating that the email message has been opened at the user computer, wherein the second server is a display ad server,
generate a tracking cookie associated with the UUID,
send the tracking cookie to the user computer over the network,
receive an HTTP request from the user computer over the network, the HTTP request including the tracking cookie, the HTTP request being transmitted as a result of loading a web page comprising at least a tag that, when processed by a web browser application on the user computer, causes the web browser application to transmit the HTTP request,
map the tracking cookie to the associated UUID, and
send the HTTP request and the associated UUID to the orchestration server over the network,
in response to receiving the HTTP request and associated UUID, the orchestration server is configured to:
retrieve, from a profile database in a content storage unit associated with the orchestration server, a specific user record associated with the UUID, the specific user record including first data relating to past behavior of a user, second data associated with the earlier advertising message previously communicated to the user computer on the first channel, and third data associated with the next advertising message to be communicated to the user computer via the second channel,
determine based on the first data, the second data, and the third data retrieved from the profile database, whether one or more conditions have been met for the user to receive the next advertising message of the sequence of advertising messages the conditions comprising online or offline actions of the user,
select the next advertising message of the sequence of advertising messages based on the determining whether one or more conditions have been met, and
send, to the second server over the network, an instruction to deliver the next message of the sequence of advertising messages to the user computer, the instruction including the associated UUID and the selected next advertising message, the next advertising message being stored in a database associated with the second server, and
in response to receiving the instruction from the orchestration server, the second server is configured to send from the second server the next advertising message to the user computer over the network, the next advertising message comprising a display ad that comprises a second advertisement for the product, wherein at least one of the one or more conditions is met when the email message has been opened, the next advertising message only being sent after the email message has been opened and in response to the email message being opened, and wherein the display ad is selected from a plurality of display ads based in part on bids received from a plurality of ad servers.

16. The system of claim 15, wherein the one or more conditions include whether or not the user has purchased a product that was advertised in the email message sent by the email server.

17. The method of claim 1, wherein the sequence of advertising messages is a sequence of marketing messages, and the second channel is different than the first channel.

18. The non-transitory computer readable storage medium of claim 8, wherein the sequence of advertising messages is a sequence of marketing messages, and the second channel is different than the first channel.

19. The system of claim 15, wherein the sequence of advertising messages is a sequence of marketing messages, and the second channel is different than the first channel.

20. The system of claim 15,
- wherein the sequence of advertising messages further includes a third advertising message comprising a mobile message that is sent from a third server, the third advertising message only being sent after the email message has been opened and in response to the email message being opened,
- wherein a criterion for selecting the next advertising message includes whether or not the next advertising message has been previously delivered to the user,
- wherein the second server advertising is configured to customize the next advertising message based on the earlier advertising message that has been previously delivered to the user, and
- wherein the earlier and next advertising messages delivered to the user are different but relate to the same product.

* * * * *